(12) United States Patent
Yoshikawa et al.

(10) Patent No.: US 6,364,532 B1
(45) Date of Patent: Apr. 2, 2002

(54) HYDRODYNAMIC BEARING AND MOTOR HAVING THE SAME

(75) Inventors: Shoichi Yoshikawa; Takao Yoshitsugu, both of Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/570,529

(22) Filed: May 12, 2000

(30) Foreign Application Priority Data

May 14, 1999 (JP) .......................................... 11-133832

(51) Int. Cl.$^7$ .............................................. F16C 32/06
(52) U.S. Cl. ..................... 384/107; 384/100; 384/114
(58) Field of Search ................................ 384/100, 107, 384/111, 112, 113, 114, 115, 118, 120

(56) References Cited

U.S. PATENT DOCUMENTS

| | | | | |
|---|---|---|---|---|
| 5,685,647 A | * | 11/1997 | Leuthold et al. | 384/113 |
| 5,806,987 A | * | 9/1998 | Nose et al. | 384/100 |
| 5,822,846 A | * | 10/1998 | Moritan et al. | 384/115 X |
| 5,908,247 A | * | 6/1999 | Leuthold et al. | 384/114 |
| 5,988,887 A | * | 11/1999 | Lee | 384/107 |
| 6,108,909 A | * | 8/2000 | Cheever et al. | 384/100 X |
| 6,126,320 A | * | 10/2000 | Ichiyama | 384/112 |

FOREIGN PATENT DOCUMENTS

| JP | 6-137320 | 5/1994 |
|---|---|---|
| JP | 2560501 | 10/1997 |

* cited by examiner

Primary Examiner—Thomas R. Hannon
(74) Attorney, Agent, or Firm—Wenderoth, Lind & Ponack, L.L.P.

(57) ABSTRACT

A bearing comprises a rotating shaft, a sleeve which surrounds the outer wall of the rotating shaft and supports the rotating shaft in such a manner that the rotating shaft is rotatable, and a thrust bearing plate which is fixed to the sleeve and supports one end of the rotating shaft. A first herringbone pattern and a second herringbone pattern are formed either on the rotating shaft or on the sleeve, wherein the first herringbone pattern is located at a first side and the second herringbone pattern is located at a second side, wherein the first side is the side where the thrust bearing plate is located, and the second side is the side opposite the first side. The relation between width-A and width-B in the first herringbone pattern is expressed by $0<(A-B)<0.2x(A+B)$, where A denotes the dimension from a turning point of the first herringbone pattern to the end thereof in the first side, and B denotes the dimension from the turning point to the end thereof in the second side, and, the relation between width-C and width-D in the second herringbone pattern is expressed by $0 ((D(C) (0.2((D+C)$, where C denotes the dimension from a turning point of the second herringbone pattern to the end thereof in the first side, and D denotes the dimension from the turning point to the end thereof in the second side. The above structure enables the reduction of the radial runout of the rotating shaft of the bearing and the improvement of the durability of the bearing.

26 Claims, 15 Drawing Sheets

HYDRODYNAMIC BEARING AND MOTOR HAVING THE SAME

FIELD OF THE INVENTION

The present invention relates to a hydrodynamic bearing for a motor and the motor having the same, which is used for a data processing apparatus such as a data storing apparatus having a disk drive, or a printer, or, for an entertainment apparatus having a disk drive for recording or reproducing images or sounds, or the like.

BACKGROUND OF THE INVENTION

In recent years, under the circumstance that the reduction of size and weight, high density recording, high speed data processing and the like are required in a data processing apparatus or in an entertainment apparatus, the improvement of the performance of a motor (small spindle motor in this occasion) used for the apparatus is also required.

In regard to the improvement of the performance of the motor, the reduction of the rotational runout of the rotor of the motor, the reduction of the noise and the improvement on the durability of the motor are mostly required, for which the improvement of the performance of a bearing used for the motor is also required.

The runout of the rotor and the noise of the motor are caused by the magnetic attraction and repulsion between the rotor magnet and the stator of the motor. That is, the rotating shaft of the rotor radially vibrates and bumps against the bearing of the rotor when the rotor is rotated. A conventional motor having a bearing whose bearing is made of sintered oleo-metal can hardly reduce the runout and the noise of the motor to a sufficiently low level.

For the improvement on the above problems, a hydrodynamic bearing has been developed, and the bearing is now being put into practical use. The hydrodynamic bearing comprises, which denotes the dimension from the turning point 163 to the end thereof in the second side. That is, the second herringbone pattern 157 is asymmetrical.

An oil reserving groove 159 is formed on the inner wall of the sleeve 155. The oil reserving groove 159 is located at the position which corresponds to the intermediate portion between the first herringbone pattern 156 and the second herringbone pattern 157 of the rotating shaft 154. A through-hole 160 is formed through the wall of the sleeve 155 in such a manner that the through-hole 160 radially extends from the oil reserving groove 159 to the outside of the sleeve 155.

In the above conventional structure, the dynamic pressure of the oil 161, which is generated at the herringbone pattern 157 when the shaft 154 is rotated, forms a stream of the oil 161, which flows toward the second side (i.e., the side where the shaft end 162 is located) since the width-E is larger than the width-F, which causes the occurrence of air bubbles in the oil 161 since air comes into the space in the sleeve 155 from the through-hole 160. Then the air bubbles further push the oil 161 outward from the space in the sleeve 155, which result in the shortage of oil 161 and causes the increase of the runout of the shaft 154 and the damage on the durability of the motor having the bearing.

FIG. 16 is a partially schematic sectional view showing another example of the structure of the hydrodynamic bearing. This type of bearing, which is also known in general, is disclosed in Japanese Utility Model Publication No.2560501.

In FIG. 16, a rotating shaft 164 is rotatably supported by a sleeve 165. A thrust bearing plate 168 is fixed to the sleeve 165 and supports one end of the shaft 164. Oil 169 is filled in the space formed with the sleeve 165, the rotating shaft 164 and the thrust bearing plate 168. On the outer wall of the rotating shaft 164, a first herringbone pattern 167 and a second herringbone pattern 166 are formed. The first herringbone pattern 167 is located at a first side (i.e., the side where the thrust bearing plate 168 is located). The second herringbone pattern 166 is located at a second side (i.e., the side opposite the first side). for example, a cylindrical rotating shaft and a sleeve, and, a fluid (oil, in most cases) is filled in a space formed with the sleeve and the rotating shaft which is inserted into the sleeve. A herringbone pattern is formed either on the shaft or on the sleeve. In the above structure, when the rotor is rotated, the rotating shaft is supported by the dynamic pressure of the fluid, which is generated at the herringbone pattern.

The hydrodynamic bearing has advantages that the size of the bearing can be reduced since the mechanical components and portions of the bearing share relatively small space comparing with that in the other bearings. Also, since the rotating shaft is supported by the sleeve via the fluid, the noise of the motor can be reduced, and the motor having the bearing is durable against shock. Also, since the load on the rotating shaft is supported by the whole circumference of the shaft (which generates an integral effect), the runout of the shaft is reduced. As is described above, the hydrodynamic bearing is structurally superior for the spindle motor.

In the hydrodynamic bearing, the structure disclosed in Japanese Non-Examined Patent Publication H6-137320 is known in general. The structure disclosed in the publication is described hereinafter with reference to FIG. 15 which is a partially schematic sectional view showing the structure of the bearing.

In FIG. 15, a rotating shaft 154 is rotatably supported by a sleeve 155. A thrust bearing plate 158, which is fixed to the sleeve 155, supports one end of the shaft 154. Oil 161 is filled in the space formed with the sleeve 155, the shaft 154 and the thrust bearing plate 158. On the outer wall of the shaft 154, a first herringbone pattern 156 and a second herringbone pattern 157 are formed. The first herringbone pattern 156 is located at a first side (i.e., at the side where the thrust bearing plate 158 is located). The second herringbone pattern 157 is located at a second side (i.e., the side opposite the first side).

In the second herringbone pattern 157, width-E, which denotes the dimension from the turning point 163 of the pattern 157 to the end thereof in the first side, is larger than width-F In the second herringbone pattern 166, width-G, which denotes the dimension from the turning point of the pattern 166 to the end thereof in the second side, is larger than width-H which denotes the dimension from the turning point of the pattern 166 to the end thereof in the first side.

Also, in the first herringbone pattern 167, width-I, which denotes the dimension from the turning point of the pattern 167 to the end thereof in the second side, is larger than width-J which denotes the dimension from the turning point of the pattern 167 to the end thereof in the first side. That is, both patterns 166 and 167 are respectively asymmetrical.

Also, two through-holes 170 and 171 are formed through the thrust bearing plate 168.

In the above structure, the oil 169 flows outside from both through-holes 170 and 171, such that the oil 169 has to be refilled for the continuous operation of the motor having this type of bearing. That is, the bearing is not suitable for continuous long time operation.

When the through-holes 170 and 171 are closed for preventing the leakage of the oil 169, the pressure around the thrust bearing plate 168 becomes high and air bubbles occur there, such that the shaft 164 enters into a state of unstable floating relative to the thrust bearing plate 168, which results in a serious problem, for instance, that the disk of a disk drive touches the pickup head of the disk drive when such a bearing is used for the spindle motor of the disk drive, due to the axial runout of the rotating shaft.

SUMMARY OF THE INVENTION

The object of the present invention is to address the problems in the conventional hydrodynamic bearing and to provide a durable hydrodynamic bearing in which the uniform and stable thickness of the oil film for the hydrodynamic bearing is realized for reducing both radial and axial runout of the rotating shaft. Another object of the present invention is to provide a motor having the durable bearing and a disk drive having the motor.

For realizing the above object, the bearing of the present invention comprises:

(a) a rotating shaft, (b) a sleeve which surrounds the outer wall of the rotating shaft and supports the rotating shaft in such a manner that the shaft is rotatable, and (c) a thrust bearing plate which is fixed to the sleeve and supports one end of the rotating shaft, where in a first herringbone pattern and a second herringbone pattern are formed either on the rotating shaft or on the sleeve, wherein the first herringbone pattern is located at a first side and the second herringbone pattern is located at a second side, wherein the first side is the side where the thrust bearing plate is located, and the second side is the side opposite the first side, wherein the relation between width-A and width-B in the first herringbone pattern is expressed by $$0<(A-B)<0.2x(A+B)$$

where A denotes the dimension from the turning point of the first herringbone pattern to the end thereof in the first side, and B denotes the dimension from the turning point to the end thereof in the second side, and, the relation between width-C and width-D in the second herringbone pattern is expressed by $$0<(D-C)<0.2x(D+C)$$

where C denotes the dimension from the turning point of the second herringbone pattern to the end thereof in the first side, and D denotes the dimension from the turning point to the end thereof in the second side.

The above structure enables the improvement of both durability and stiffness of the bearing.

Also, another structure of the bearing for realizing the above object comprises:

(a) a rotating shaft, (b) a sleeve which surrounds the outer wall of the rotating shaft and supports the rotating shaft in such a manner that the shaft is rotatable, and (c) a thrust bearing plate which is fixed to the sleeve and supports one end of the rotating shaft, wherein a first herringbone pattern and a second herringbone pattern are formed either on the rotating shaft or on the sleeve, and an oil reserving groove is formed on the sleeve, wherein the oil reserving groove is located at the position which corresponds to the intermediate portion between the first herringbone pattern and the second herringbone pattern, and a through-hole and an air-bubble-holding-hollow are formed in the wall of the sleeve, wherein the through-hole extends from the thrust bearing plate up to the oil reserving groove, also up to the air-bubble-holding-hollow.

In the above structure, since oil can be reserved in the through-hole too, the shortage of the oil is more surely prevented, and also, air bubbles in the bearing can be more surely eliminated, such that the further improvement of the durability of the bearing can be realized.

Also, still another structure of the bearing for realizing the above object comprises:

(a) a rotating shaft, (b) a sleeve which surrounds the outer wall of the rotating shaft and supports the rotating shaft in such a manner that the shaft is rotatable, and (c) a thrust bearing plate which is fixed to the sleeve and supports one end of the rotating shaft, wherein a first herringbone pattern and a second herringbone pattern are formed either on the rotating shaft or on the sleeve, wherein the turning point of the first herringbone pattern and the turning point of the second herringbone pattern are located on a same phantom line axially extended on the surface of the rotating shaft.

In the above structure, the phase of dynamic pressure (i.e., the operating phase of the stiffness of the bearing) at the first herringbone pattern agrees with that at the second herringbone pattern, such that the runout including Non-Repeatable Runout (NRRO) of the rotating shaft can be reduced.

Also, for realizing the above object, the motor of the present invention comprises:

(a) a rotor having a rotating shaft fixed thereto, (b) a bearing, and (c) a stator having the bearing, wherein the bearing used for the motor is one of the above bearings.

The above structure enables the motor to have advantages of the bearing described above.

Also, for realizing the above object, the disk drive of the present invention has a motor comprising:

(a) a rotor which has a rotating shaft fixed thereto and rotates a disk, (b) a bearing, and (c) a stator having the bearing, wherein the bearing used for the motor is one of the above bearings.

The above structure enables the disk drive to have advantages of the bearing described above.

DETAILED DESCRIPTION OF THE INVENTION

Hereinafter exemplary embodiments of the present invention are described on reference to illustrations.

First Exemplary Embodiment

Figure 1:
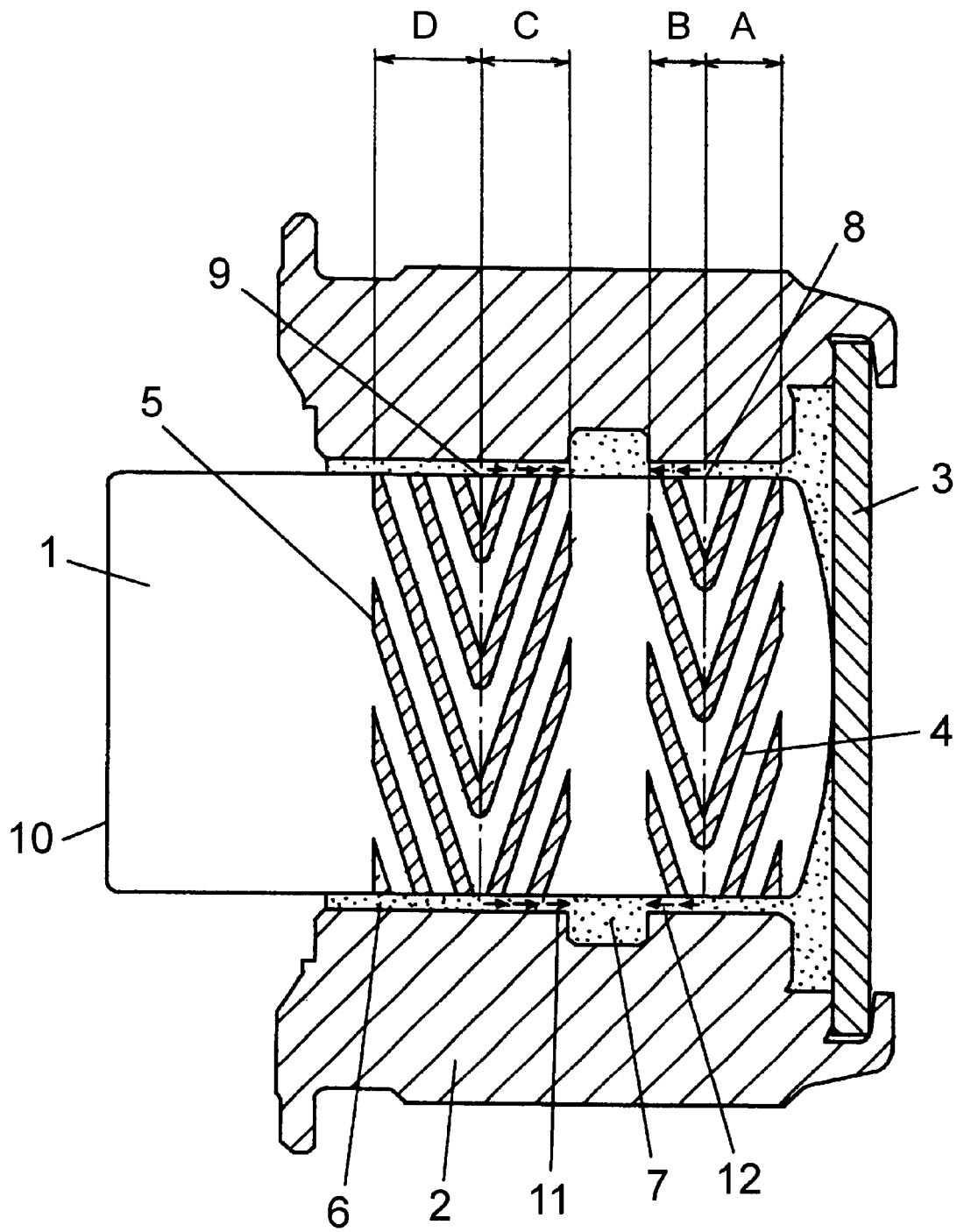
FIG. 1 is a partially schematic sectional view showing the structure of a bearing in a first exemplary embodiment of the present invention.

FIG. 1 is a partially schematic sectional view showing the structure of a bearing in the first exemplary embodiment of the present invention.

In FIG. 1, a rotating shaft 1 is rotatably supported by a sleeve 2. One end of the shaft 1 is spherically shaped. A thrust bearing plate 3 is fixed to the sleeve 2 and supports the spherical end of the shaft 1. The sleeve 2 supports the radial load of the shaft 1, and the thrust bearing plate 3 supports the axial load of the shaft 1. On the outer wall of the shaft 1, a first herringbone pattern 4 and a second herringbone pattern 5 are formed. The first herringbone pattern 4 is located at a first side (i.e., the side where the thrust bearing plate 3 is located), and the second herringbone pattern 5 is located at a second side (i.e., the side opposite the first side, and where shaft end 10 is located). An oil reserving groove 7 is formed on the inner wall of the sleeve 2. The oil reserving groove 7 is located at the position which corresponds to the intermediate portion between the first herringbone pattern 4 and the second herringbone pattern 5 of the rotating shaft 1. Oil 6 is filled in a space formed with the sleeve 2, shaft 1 and the thrust bearing plate 3.

In the first herringbone pattern 4, the relation between width-A and width-B is expressed by $$0 < (A-B) < 0.2 \times (A+B)$$

where A denotes the dimension from a turning point 8 of the first herringbone pattern 4 to the end thereof in the first side, and B denotes the dimension from the turning point 8 to the end thereof in the second side.

On the other hand, in the second herringbone pattern 5, the relation between width-C and width-D is expressed by $$0 < (D-C) < 0.2 \times (D+C)$$

where C denotes the dimension from a turning point 9 of the second herringbone pattern 5 to the end thereof in the first side, and D denotes the dimension from the turning point 9 to the end thereof in the second side.

In the above structure of the bearing having the asymmetrical herringbone patterns 4 and 5, when the rotating shaft 1 is rotated, the oil 6 flows toward the oil reserving groove 7 along arrows 12 and 11 respectively since the dynamic pressure generated at the side of width-A and that generated at the side of width-D in the herringbone patterns 4 and 5 are respectively larger than those generated at the sides of width-B and width-C. That is, the oil 6 does not leak outside, and the space formed with the sleeve 2, the shaft 1 and the thrust bearing plate 3 is always filled with the oil 6. As a result, the durability of the bearing is improved.

In the above structure, when the dimensional differences between A and B, and between C and D are too large, the dynamic pressure at the sides having smaller width (i.e., B and C) becomes too low and a bearing span between the herringbone patterns 4 and 5 decreases, which causes a decrease of the stiffness of the bearing. According to the results of experiments, the preferable dimensional differences between A and B, and between C and D are respectively 0%–20% of the respective total widths (A+B, D+C) in the respective patterns. The ratio has been determined taking the practical preciseness in forming the patterns into consideration. In the above range of difference, superior effects are obtained in both durability and stiffness of the bearing.

In the above description, the herringbone patterns 4 and 5 are formed on the outer wall of the shaft 1. However, a similar effect is obtained by forming the patterns on the inner wall of the sleeve 2.

Second Exemplary Embodiment

Figure 2:
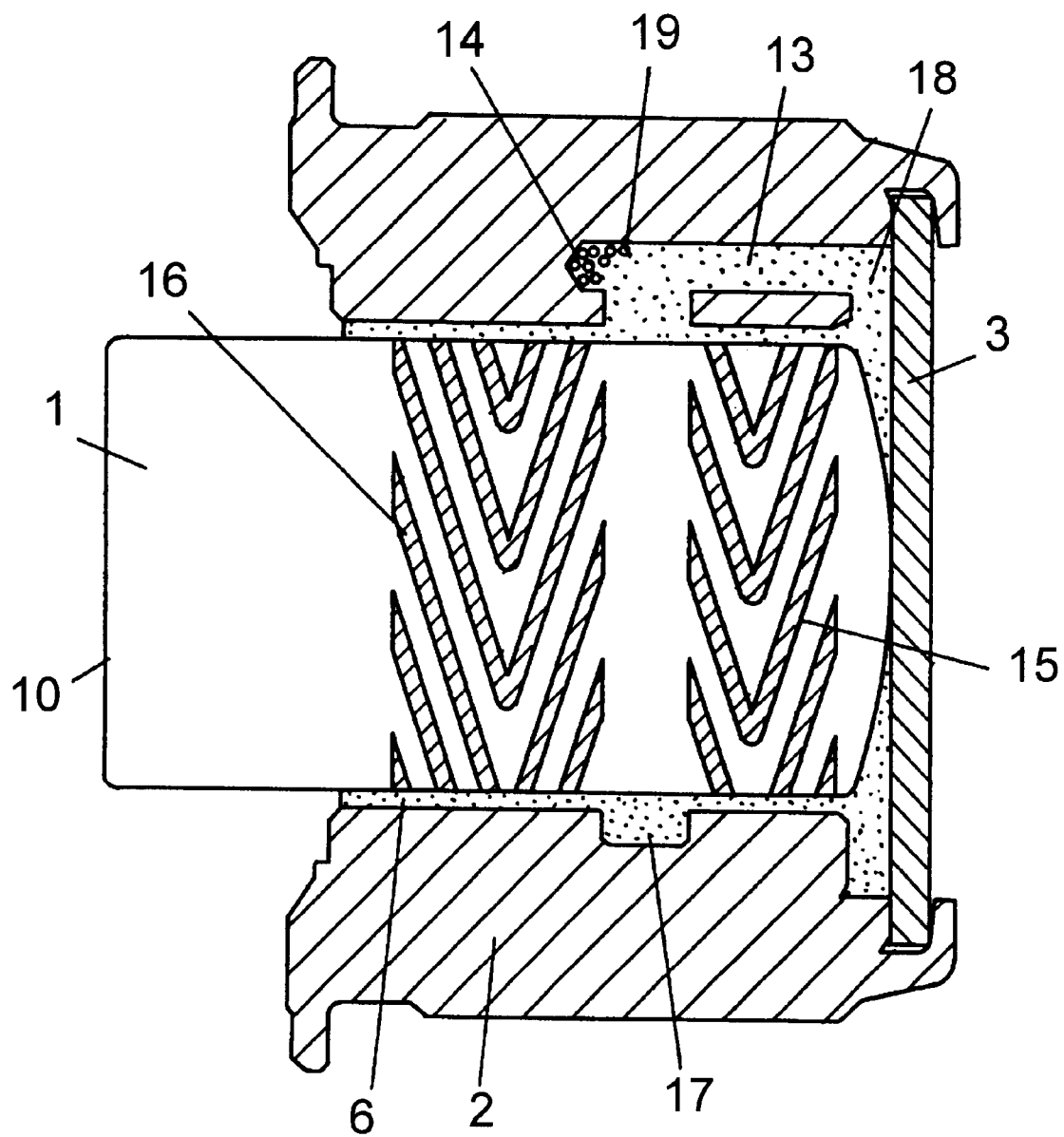
FIG. 2 is a partially schematic sectional view showing the structure of a bearing in a second exemplary embodiment of the present invention.

FIG. 2 is a partially schematic sectional view showing the structure of a bearing in the second exemplary embodiment of the present invention. The reference numerals for the components in FIG. 2 are identical with those for their corresponding components in FIG. 1 of the first exemplary embodiment, and the description of the components having the identical numerals is omitted in this exemplary embodiment.

In FIG. 2, as in FIG. 1 of the first exemplary embodiment, an oil reserving groove 17 is formed on the inner wall of the sleeve 2, wherein the oil reserving groove 17 is located at the position which corresponds to the intermediate portion between a first herringbone pattern 15 and a second herringbone pattern 16, and also, a space between the sleeve 2 and the thrust bearing plate 3 forms an oil reservoir 18. In this exemplary embodiment, different from the first exemplary embodiment, in the wall of the sleeve 2, a through-hole 13 and an air-bubble-holding-hollow 14 are formed. The through-hole 13 extends along the axial direction of the shaft 1 from the oil reservoir 18 up to the oil reserving groove 17, and also up to the air-bubble-holding-hollow 14. The oil reservoir 18 is located at one end of the through-hole 13 (i.e., at the side where the thrust bearing plate 3 is located) and the air-bubble-holding-hollow 14 is located at the other end of the through-hole 13 (i.e., at the side where the shaft end 10 is located).

In the above structure, since the oil 6 can be reserved in the through-hole 13 too, the shortage of the oil 6 can be more surely prevented, and also air bubbles in the bearing can be more surely eliminated since the air bubbles move upward and stay in the air-bubble-holding-hollow 14. As a result, a more stable rotation of the rotating shaft is realized, and also the durability of the bearing is further improved.

Third Exemplary Embodiment

Figure 3:
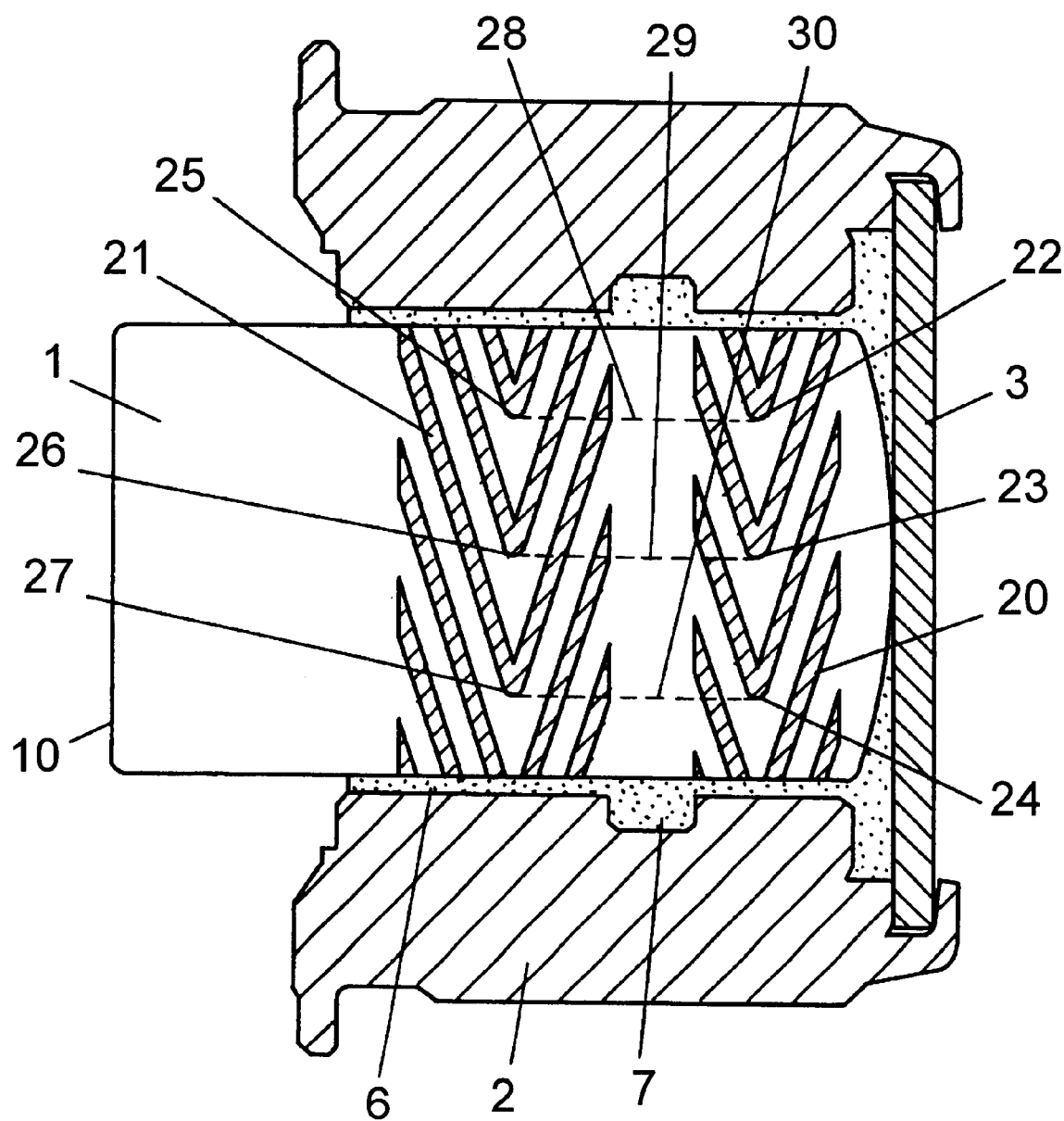
FIG. 3 is a partially schematic sectional view showing the structure of a bearing in a third exemplary embodiment of the present invention.

FIG. 3 is a partially schematic sectional view showing the structure of a bearing in the third exemplary embodiment of the present invention. The reference numerals for the components in FIG. 3 are identical with those for their corresponding components in FIG. 1 of the first exemplary embodiment and in FIG. 2 of the second exemplary embodiment, and the description of the components having the identical numerals is omitted in this exemplary embodiment.

In FIG. 3, a first herringbone pattern 20 and a second herringbone pattern 21 are formed in such a manner that a turning point 22 of the first herringbone pattern 20 and a turning point 25 of the second herringbone pattern 21 are located on a same phantom line 28 which axially extends on the outer wall of the rotating shaft 1. In a manner similar to the above description, turning points 23 and 24 of the first herringbone pattern 20 and turning points 26 and 27 of the second herringbone pattern 21 are respectively located on the same respective axial phantom lines 29 and 30.

In the above structure, the phase of the dynamic pressure (i.e., the operating phase of the stiffness of the bearing) generated at the first herringbone pattern 20 agrees with that generated at the second herringbone pattern 21, such that the runout including the Non-Repeatable Runout (NRRO) of the rotating shaft can be reduced (i.e., mechanical preciseness in the rotation of the shaft is improved).

Fourth Exemplary Embodiment

Figure 4:
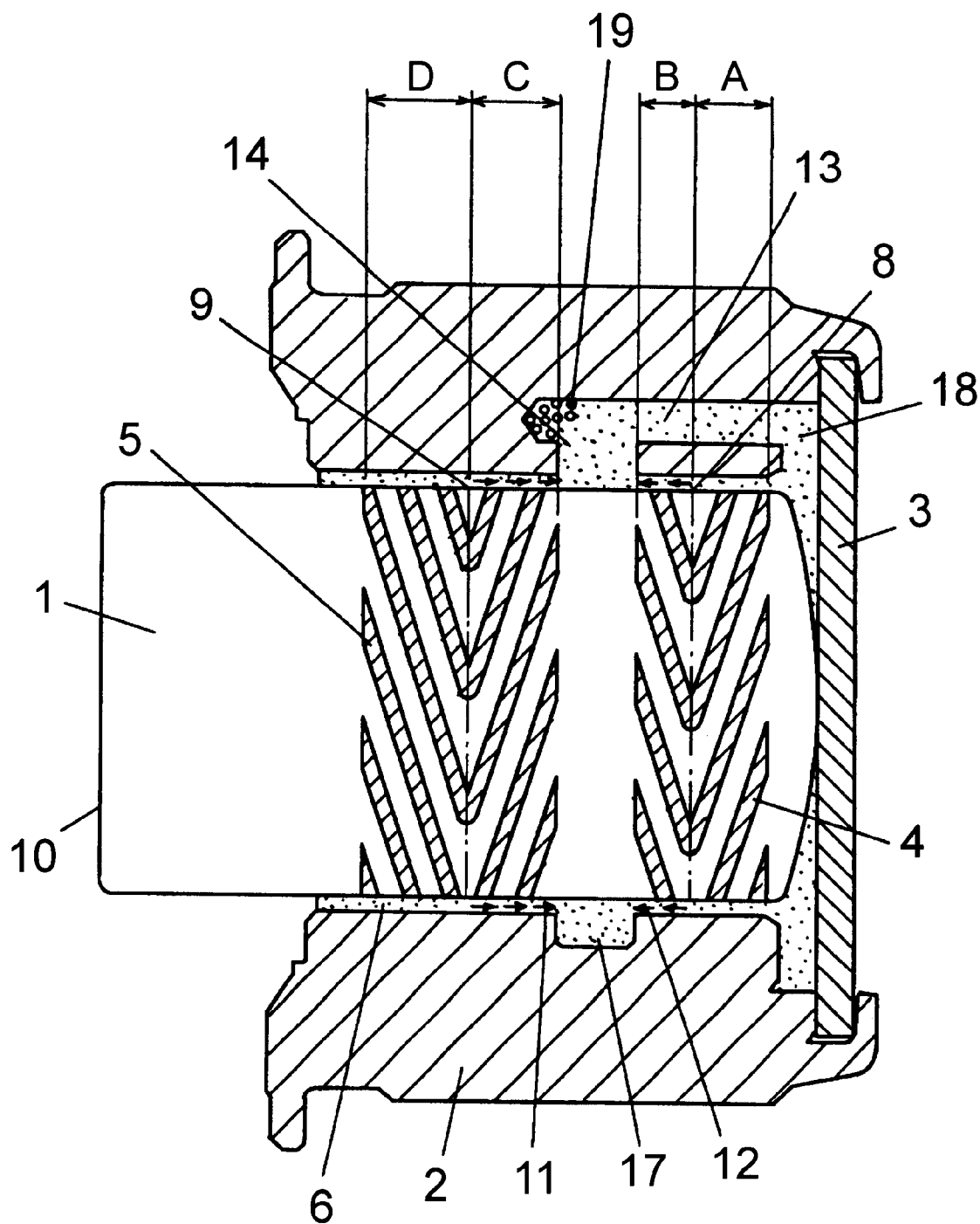
FIG. 4 is a partially schematic sectional view showing the structure of a bearing in a fourth exemplary embodiment of the present invention.

FIG. 4 is a partially schematic sectional view showing the structure of a bearing in the fourth exemplary embodiment of the present invention. The reference numerals for the components in FIG. 4 are identical with those for their corresponding components in FIG. 1 of the first exemplary embodiment, in FIG. 2 of the second exemplary embodiment, and in FIG. 3 of the third exemplary embodiment, and the description of the components having the identical reference numerals is omitted in this exemplary embodiment.

In FIG. 4, as in FIG. 1 of the first exemplary embodiment, the relation between width-A and width-B, and, the relation between width-C and width-D in the herringbone patterns 4 and 5 are respectively expressed by $$0<(A-B)<0.2\times(A+B)$$

and $$0<(D-C)<0.2\times(D+C).$$

Also, in this exemplary embodiment, the through-hole 13 is formed between the oil reserving groove 17 and the oil reservoir 18 as in FIG. 2 of the second exemplary embodiment.

In the structure described above, the oil 6 circulates along a circulating stream, for instance, from the oil reservoir 18 to the first herringbone pattern 4, then to the oil reserving groove 17, then to the through-hole 13, then back to the oil reservoir 18. In this case, since the oil 6 can be reserved in the through-hole 13 too, the oil 6 is more steadily circulated along the above circulating stream, such that the rise of temperature at the point-contact formed with the shaft 1 (having a pivot structure) and the thrust bearing plate 3 (i.e., the rise of temperature at the point-contact of the thrust bearing section of the bearing) can be surely suppressed.

Figure 5:
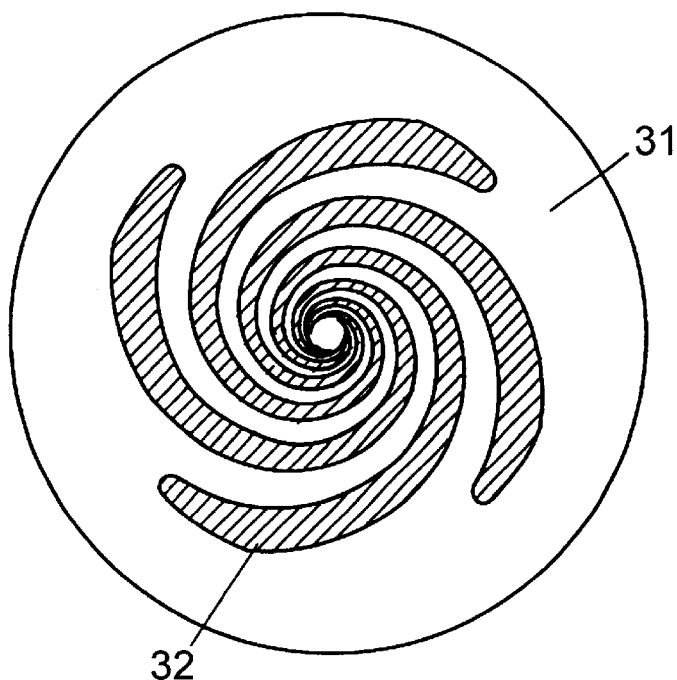
FIG. 5 shows a spiral pattern formed on a thrust bearing plate in the exemplary embodiments of the present invention.
Figure 6:
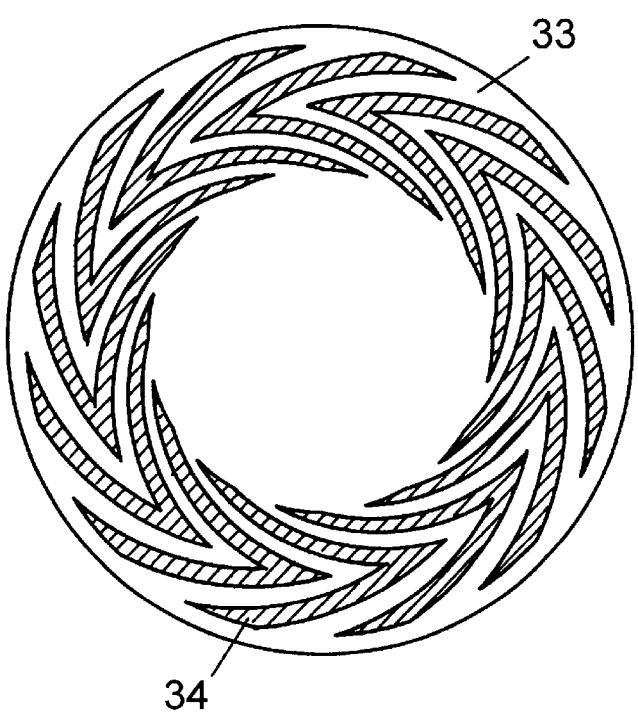
FIG. 6 shows a herringbone pattern formed on the thrust bearing plate in the exemplary embodiments of the present invention.

Also, in this exemplary embodiment, the structure of a hydrodynamic bearing can be applied to the thrust bearing section of the bearing. That is, a thrust bearing plate 31 of FIG. 5 having a spiral pattern 32, or, a thrust bearing plate 33 of FIG. 6 having a herringbone pattern 34 can be used in place of the thrust bearing plate 3.

When the thrust bearing plate 31 or the thrust bearing plate 33 is used in place of the thrust bearing plate 3, the oil 6 flows along the pattern formed on the plate, and dynamic pressure is generated at the pattern when the shaft 1 is rotated, such that the shaft 1 enters into the state of floating relative to the thrust bearing plate. In this case, the stable and precise state of floating of the shaft 1 is realized since the oil 6 is steadily circulated via the through-hole 13 where the sufficient volume of the oil 6 is reserved.

Fifth Exemplary Embodiment

Figure 7:
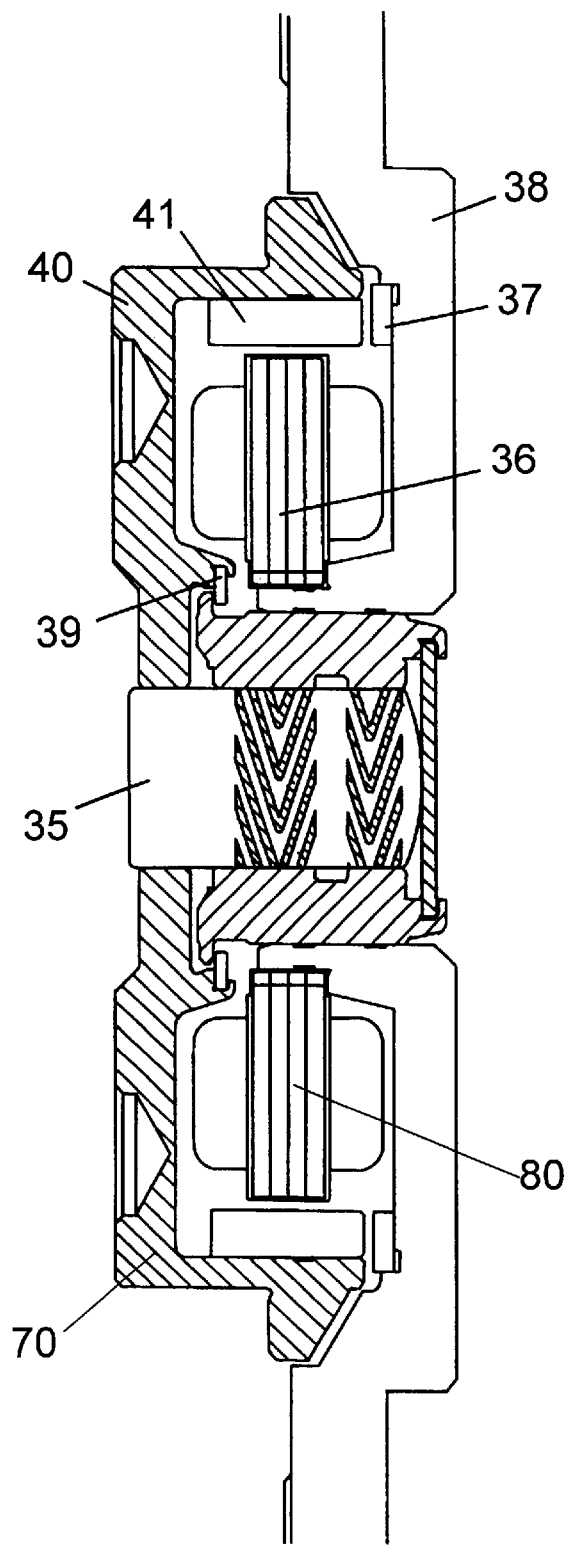
FIG. 7 is a partially schematic sectional view showing the structure of a motor in a fifth exemplary embodiment of the present invention.

FIG. 7 is a partially schematic sectional view showing a motor in the fifth exemplary embodiment of the present invention. The reference numerals for the components in FIG. 7 are identical with those for their corresponding components in the illustrations of the embodiments described above, and the description of the components having the identical reference numerals is omitted in this exemplary embodiment.

In FIG. 7, the structure of a bearing 35 is identical with that of FIG. 1 in the first exemplary embodiment. A sleeve of the bearing 35 is fixed to abase 38 by adhesive bonding or the like, and a winding assembly 36 is also fixed to the base 38, and a stator 80 is formed. A hub 40 is fixed to a shaft of a rotor 70 by pressure bonding or the like, and a rotor magnet 41 is fixed to the hub 40. The magnet 41 of the rotor 70 faces the winding assembly 36 of the stator 80 via an air gap.

In the motor having the above structure, the rotor 70, which is rotatably supported by the bearing 35, rotates when electricity is applied to the winding assembly 36 since a magnetic circuit is formed between the winding assembly 36 and the magnet 41 by the application of electricity.

In the above structure, as is described in the first exemplary embodiment, the bearing 35 has superior durability since the oil steadily circulates in the bearing without leaking outside. As a result, a durable motor is realized by using the durable bearing.

Sixth Exemplary Embodiment

Figure 8:
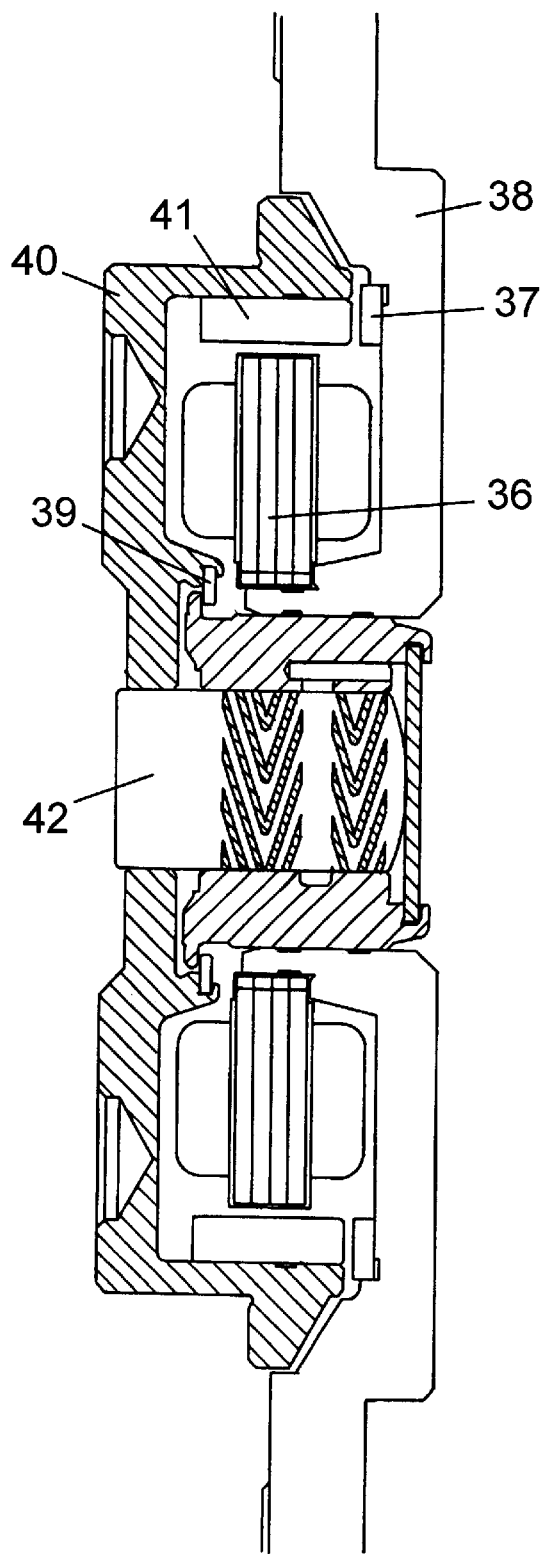
FIG. 8 is a partially schematic sectional view showing the structure of a motor in a sixth exemplary embodiment of the present invention.

FIG. 8 is a partially schematic sectional view showing the structure of a motor in the sixth exemplary embodiment of the present invention. The reference numerals for the components in FIG. 8 are identical with those for their corresponding components in the illustrations of the embodiments described above, and the description of the components having the identical reference numerals is omitted in this exemplary embodiment.

In FIG. 8, the structure of a bearing 42 is identical with that of FIG. 2 in the second exemplary embodiment.

In the above structure, as is described in the second exemplary embodiment, since the oil is reserved in the through-hole too, the oil circulates more steadily in the bearing. Also, air bubbles in the bearing can be more surely eliminated since the air bubbles move upward and stay in the air-bubble-holding-hollow. As a result, a durable motor is realized by using the durable bearing.

Seventh Exemplary Embodiment

Figure 9:
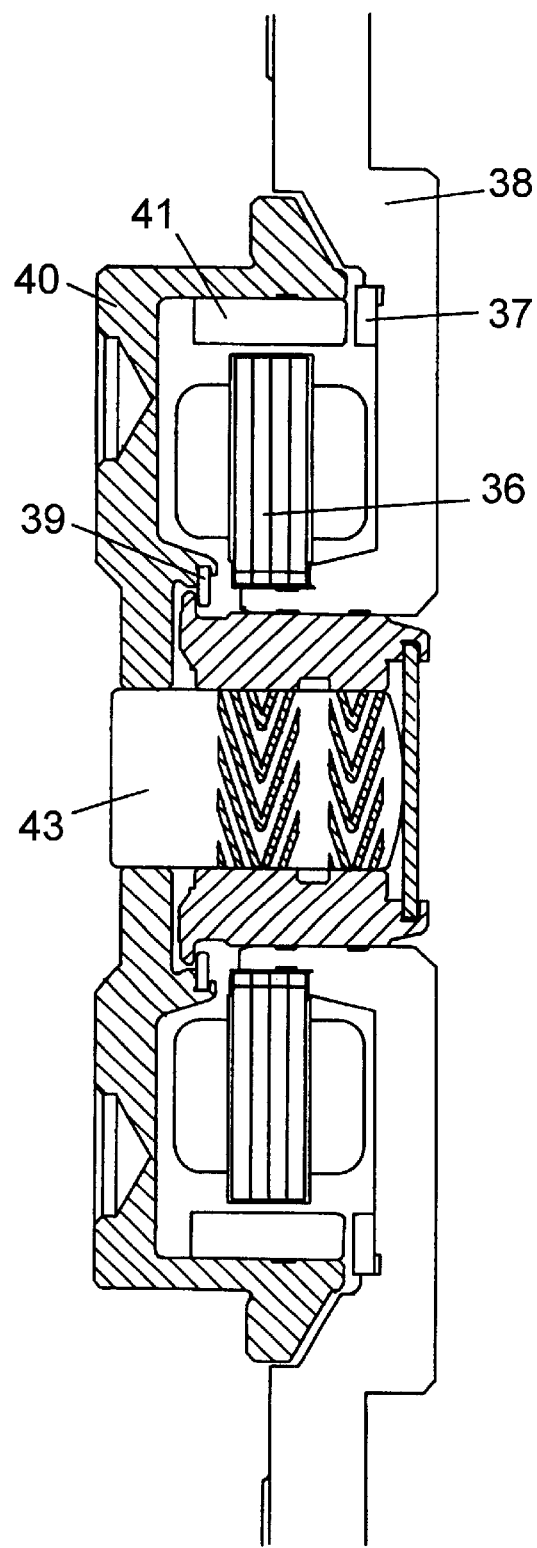
FIG. 9 is a partially schematic sectional view showing the structure of a motor in a seventh exemplary embodiment of the present invention.

FIG. 9 is a partially schematic sectional view showing the structure of a motor in the seventh exemplary embodiment of the present invention. The reference numerals for the components in FIG. 9 are identical with those for their corresponding components in the illustrations of the embodiments described above, and the description of the components having the identical reference numerals is omitted in this exemplary embodiment.

In FIG. 9, the structure of a bearing 43 is identical with that of FIG. 3 in the third exemplary embodiment.

In the above structure, as is described in the third exemplary embodiment, the phase of the dynamic pressure generated at the first herringbone pattern agrees with that generated at the second herringbone pattern. As a result, the motor having the rotor whose radial runout is reduced can be realized.

Eighth Exemplary Embodiment

Figure 10:
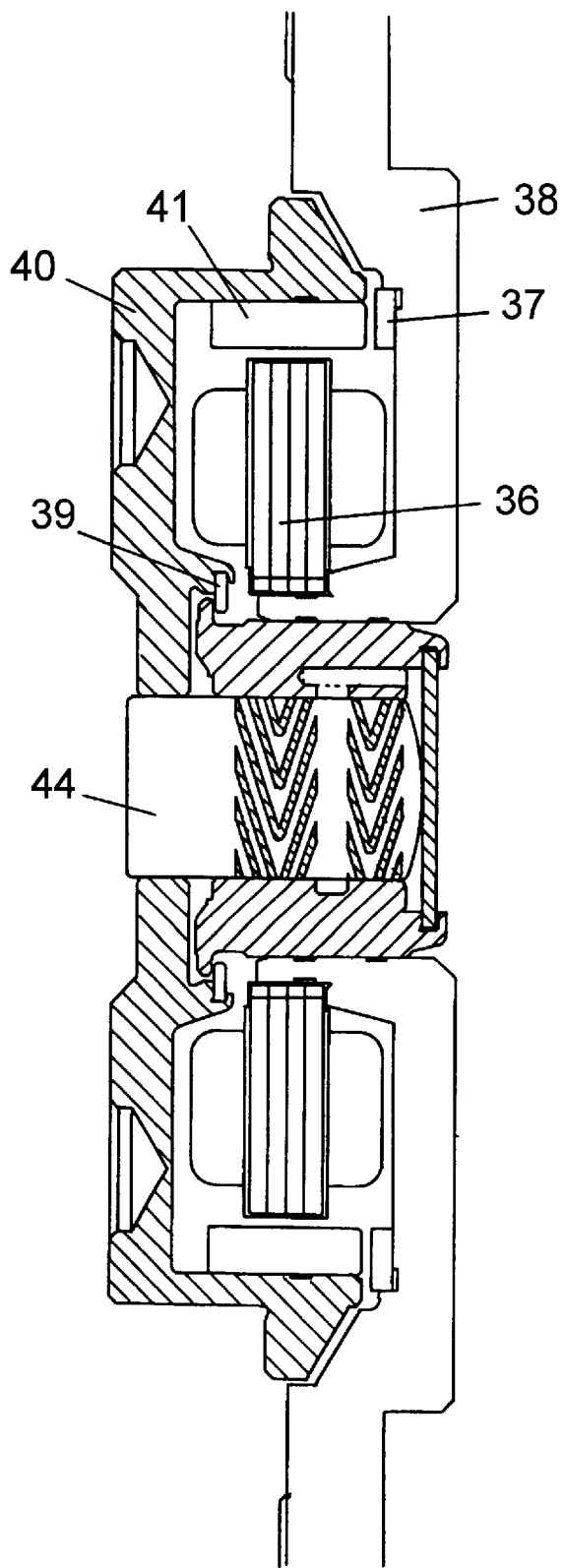
FIG. 10 is a partially schematic sectional view showing the structure of a motor in an eighth exemplary embodiment of the present invention.

FIG. 10 is a partially schematic sectional view showing the structure of a motor in the eighth exemplary embodiment of the present invention. The reference numerals for the components in FIG. 10 are identical with those for their corresponding components in the illustrations of the embodiments described above, and the description of the components having the identical reference numerals is omitted in this exemplary embodiment.

In FIG. 10, the structure of a bearing 44 is identical with that of FIG. 4 in the fourth exemplary embodiment.

In the above structure, as is described in the fourth exemplary embodiment, the rise of temperature at the point-contact of the thrust bearing section of the bearing is suppressed since the oil steadily circulates around the point-contact. Also, in the case where the hydrodynamic structure is applied to the thrust bearing section by using the thrust bearing plate having the spiral pattern or the herringbone pattern described in the fourth exemplary embodiment, a stable state of floating of the shaft can be realized since the oil is steadily circulated via the through-hole where the sufficient volume of the oil is reserved. As a result, the motor having the rotor whose rotating shaft is in the state of stable floating can be realized.

Ninth Exemplary Embodiment

Figure 11:
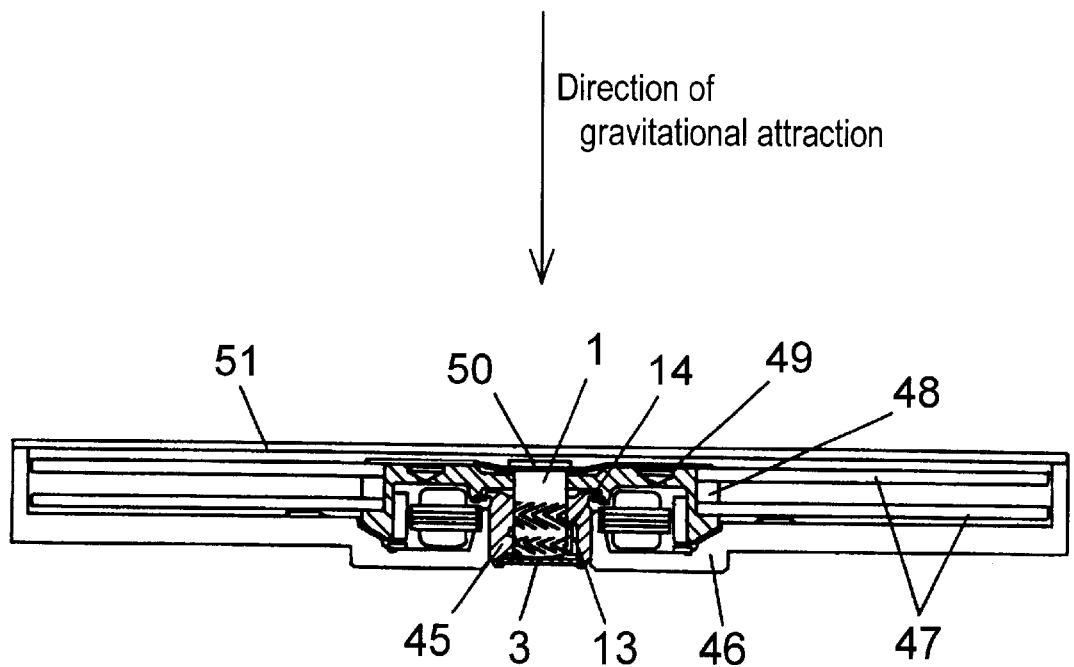
FIG. 11 is a partially schematic sectional view showing an example of the structure of a disk drive in a ninth exemplary embodiment of the present invention.
Figure 12:
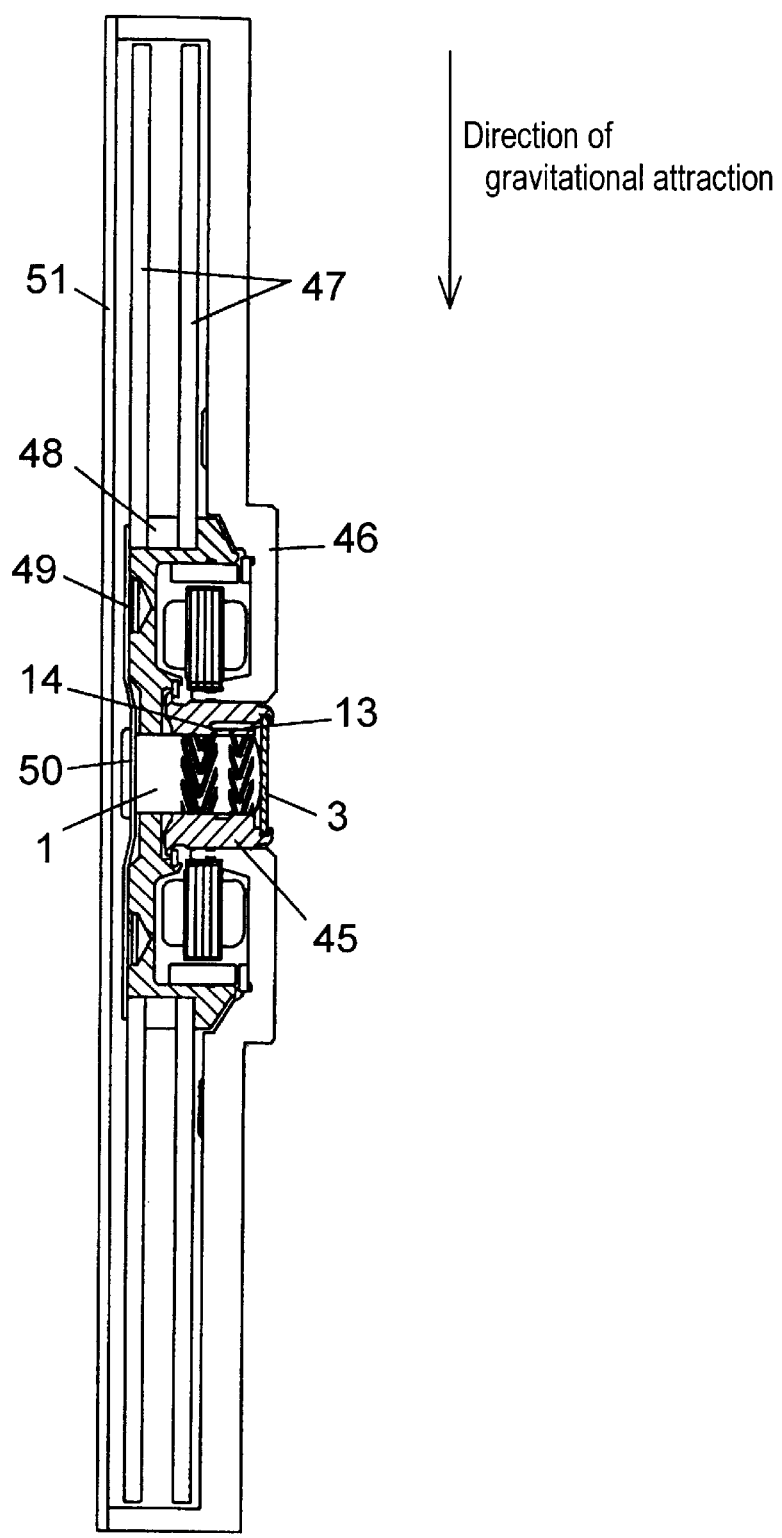
FIG. 12 is a partially schematic sectional view showing another example of the structure of the disk drive in the ninth exemplary embodiment of the present invention.

FIG. 11 is a partially schematic sectional view showing an example of the structure of a disk drive in the ninth exemplary embodiment of the present invention, and FIG. 12 is a partially schematic sectional view showing another example of the structure of the disk drive in the same. The reference numerals for the components in FIG. 11 and FIG. 12 are identical with those for their corresponding components in the illustrations of the embodiments described above, and the description of the components having the identical reference numerals is omitted in this exemplary embodiment.

In each of FIG. 11 and FIG. 12, the structure of a motor 46 is identical with that of FIG. 8 in the sixth exemplary embodiment. That is, the bearing of the motor 46 has the through-hole 13 and the air-bubble-holding-hollow 14 whose details are shown in FIG. 2 of the second exemplary embodiment.

In this exemplary embodiment, as shown in FIG. 11, the motor 46 is installed to the disk drive in such a manner that the rotating shaft 1 of the motor 46 enters into a vertical state, and that the air-bubble-holding-hollow 14 is located above the thrust bearing plate 3 in the field where gravitational attraction works vertically. On the other hand, in FIG. 12, the motor 46 is installed to the disk drive in such a manner that the rotating shaft 1 enters into a horizontal state, and that the air-bubble-holding-hollow 14 is located above the rotating shaft 1 in the field where gravitational attraction works vertically.

Also, each of the disk drives of FIG. 11 and FIG. 12 in this exemplary embodiment has the structure that a plurality of disks 47 are fixed to a hub of the motor 46 with a damper 49 and a screw 50, and a spacer 48 is disposed for spatially separating the respective disks 47 each other. Also, a cover 51 is disposed for protecting the motor 46 and the disks 47.

In each of the disk drives of FIG. 11 and FIG. 12 in this exemplary embodiment having the above structure, air bubbles in the bearing of the motor 46 are more surely eliminated since the air bubbles move upward and stay in the air-bubble-holding-hollow 14, such that the oil is more steadily circulated in the bearing of the disk drive. As a result, a durable disk drive can be realized by installing the bearing in such a manner as is described above.

Tenth Exemplary Embodiment

Figure 13:
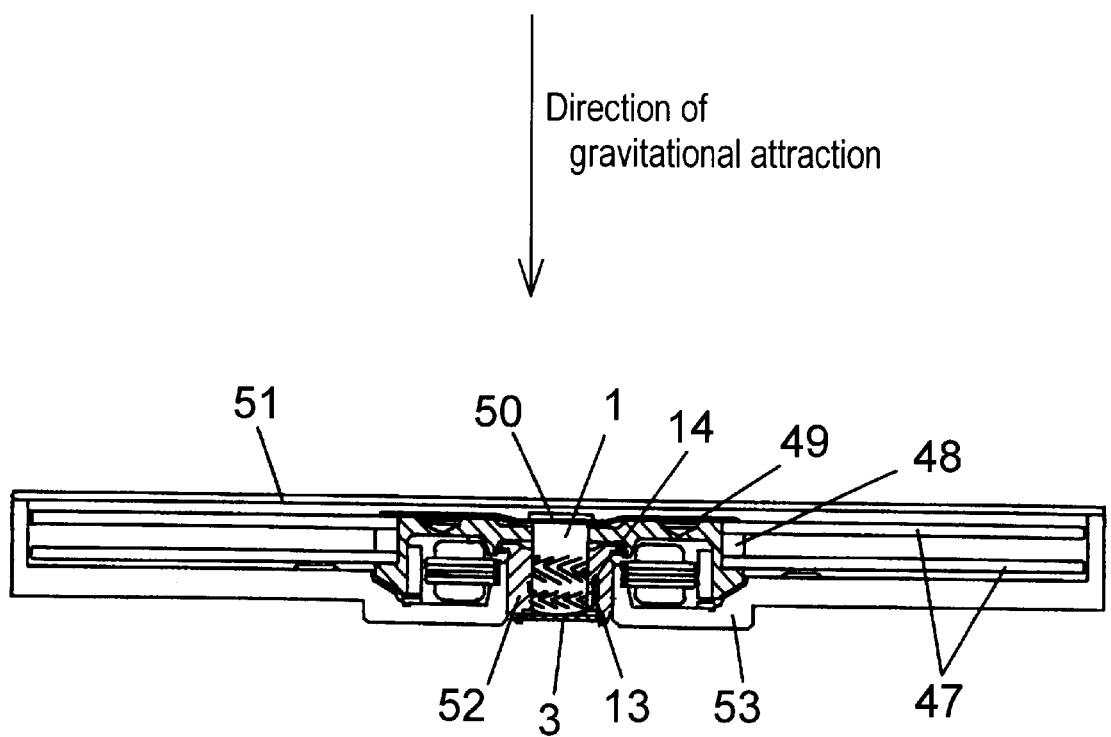
FIG. 13 is a partially schematic sectional view showing an example of the structure of a disk drive in a tenth exemplary embodiment of the present invention.
Figure 14:
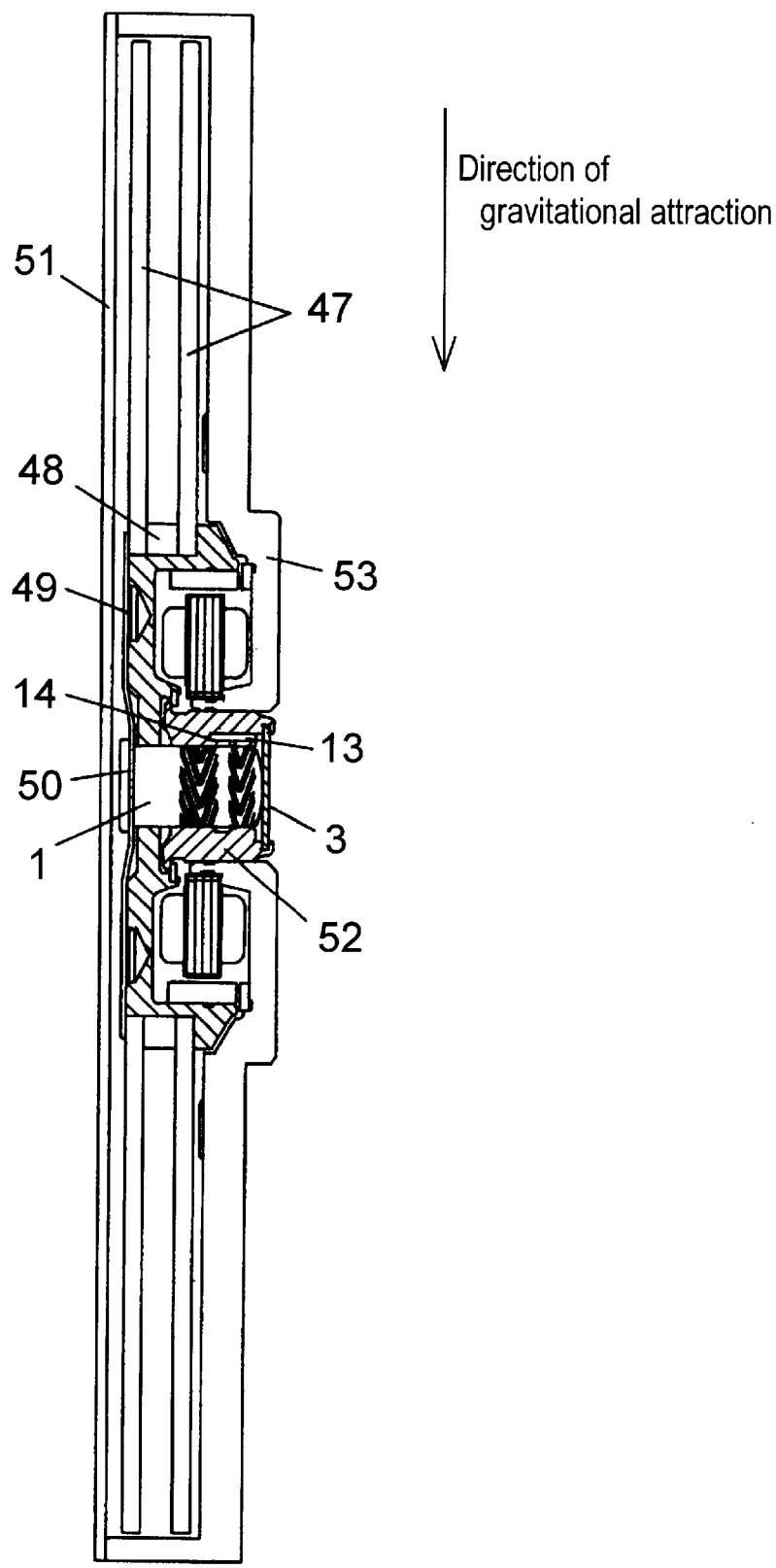
FIG. 14 is a partially schematic sectional view showing another example of the structure of the disk drive in the tenth exemplary embodiment of the present invention.
Figure 15:
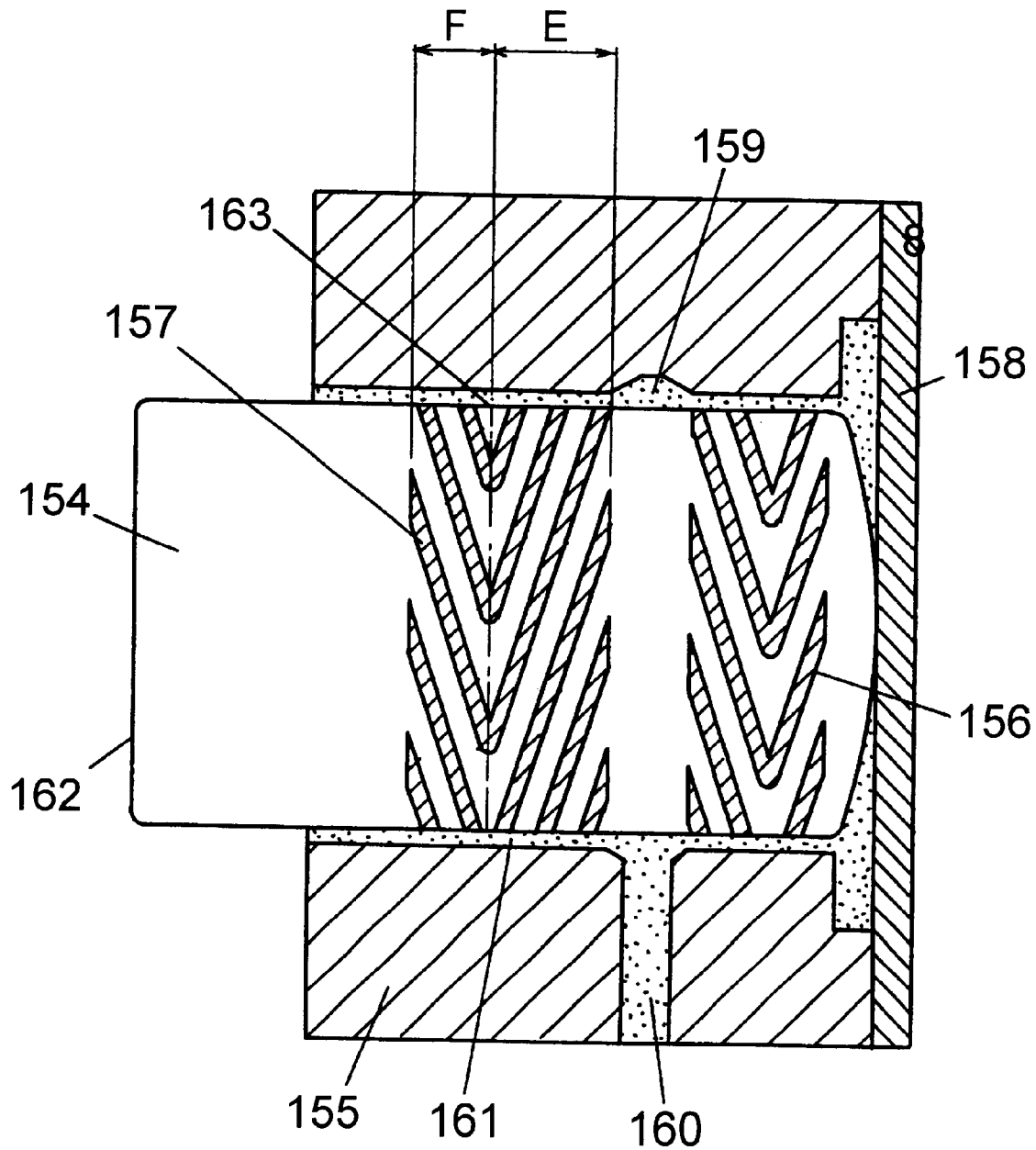
FIG. 15 is a partially schematic sectional view showing an example of the structure of a conventional bearing.
Figure 16:
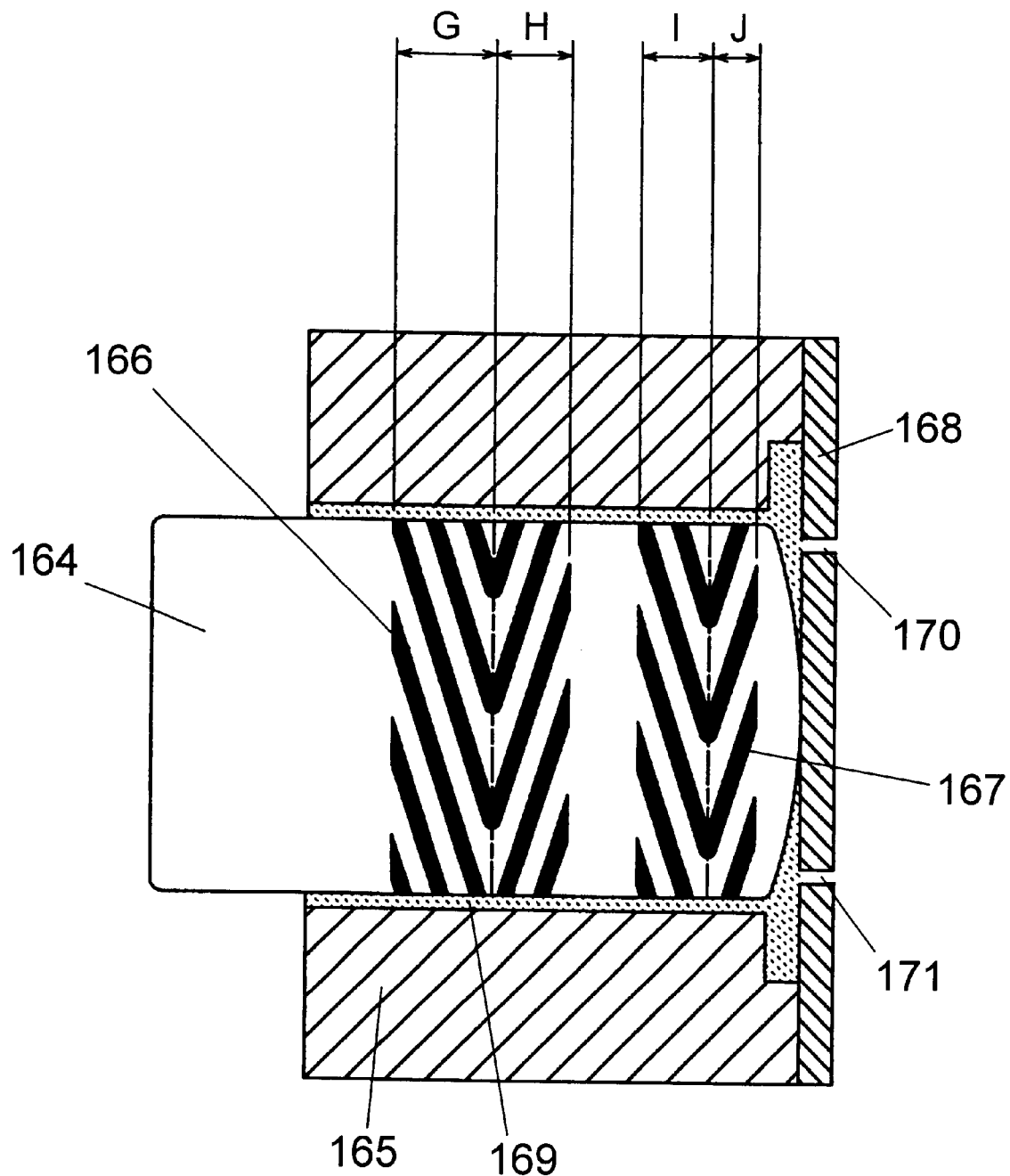
FIG. 16 is a partially schematic sectional view showing another example of the structure of the conventional bearing.

FIG. 13 is a partially schematic sectional view showing an example of the structure of a disk drive in the tenth exemplary embodiment of the present invention, and FIG. 14 is a partially schematic sectional view showing another example of the structure of the disk drive of the present invention. The reference numerals for the components in FIG. 13 and FIG. 14 are identical with those for their corresponding components in the illustrations of the embodiments described above, and the description of the components having the identical reference numerals is omitted in this exemplary embodiment.

In each of FIG. 13 and FIG. 14, the structure of a motor 53 is identical with that of FIG. 10 in the eighth exemplary embodiment. That is, the bearing of the motor 53 has the through-hole 13 and the air-bubble-holding-hollow 14, and the herringbone patterns have the structure shown in FIG. 4 of the fourth exemplary embodiment.

In FIG. 13, the motor 53 is installed to the disk drive in such a manner that the rotating shaft 1 of the motor 53 enters into a vertical state, and that the air-bubble-holding-hollow 14 of the bearing is located above the thrust bearing plate 3 in the field where gravitational attraction works vertically. On the other hand, in FIG. 14, the motor 53 is installed to the disk drive in such a manner that the rotating shaft 1 enters into a horizontal state, and that the air-bubble-holding-hollow 14 of the bearing is located above the rotating shaft 1 in the field where gravitational attraction works vertically.

In each of the disk drives of FIG. 13 and FIG. 14 in this exemplary embodiment having the above structure, the air bubbles in the bearing of the motor 53 can be more surely eliminated since the air bubbles move upward and stay in the air-bubble-holding-hollow 14, such that the oil is more steadily circulated in the bearing of the disk drive.

Also, as is described in the fourth exemplary embodiment, since the oil is circulated around the point-contact of the thrust bearing section of the bearing, the rise of the temperature at the point-contact is surely suppressed. As a result, a durable disk drive can be realized.

In the above exemplary embodiments, the herringbone patterns are formed on the outer wall of the rotating shaft. However, the similar effect can be obtained by forming the herringbone patterns on the inner wall of the sleeve.

As is described above, in the hydrodynamic bearing of the present invention, the radial and axial runout of the rotating shaft of the bearing can be reduced, and also the durability of the bearing is improved. Also, in a motor having the durable bearing, the effectiveness and the durability of the motor can be improved, and also the power-consumption-increase with the-passage-of-time in the motor can be suppressed, such that the saving of power consumption is realized. Also, in a disk drive having the durable motor, the durability of the disk drive is also improved, such that, for example, the data in a storing unit having the durable disk drive can be safely stored for a long period of time.

What is claimed is:

1. A bearing comprising:
   (a) a rotating shaft;
   (b) a sleeve which surrounds an outer wall of said rotating shaft and supports said rotating shaft in such a manner that said rotating shaft is rotatable; and
   (c) a thrust bearing plate which is fixed to said sleeve and supports one end of said rotating shaft,
   wherein a first herringbone pattern and a second herringbone pattern are formed on one of said rotating shaft and said sleeve, wherein said first herringbone pattern is located at a first side and said second herringbone pattern is located at a second side, wherein the first side is a side where said thrust bearing plate is located, and the second side is a side opposite the first side,
   wherein a relation between width-A and width-B in said first herringbone pattern is expressed by $$0<(A-B)<0.2x(A+B)$$

where A denotes a dimension from a turning point of said first herringbone pattern to an end thereof in the first side, and B denotes a dimension from the turning point to an end thereof in the second side,
   and, a relation between width-C and width-D in said second herringbone pattern is expressed by $$0<(D-C)<0.2x(D+C)$$

where C denotes a dimension from a turning point of said second herringbone pattern to an end thereof in the first side, and D denotes a dimension from the turning point to an end thereof in the second side.

2. The bearing according to claim 1, wherein one end of said rotating shaft is spherically shaped.

3. The bearing according to claim 1, wherein one of a spiral pattern and a herringbone pattern is formed on said thrust bearing plate.

4. The bearing according to claim 1, wherein an oil reserving groove is formed on said sleeve, wherein said oil reserving groove is located at a position which corresponds to an intermediate portion between said first herringbone pattern and said second herringbone pattern, and, a through-hole and an air-bubble-holding-hollow are formed in a wall of said sleeve, wherein said through-hole extends from said thrust bearing plate up to said oil reserving groove and up to said air-bubble-holding-hollow.

5. The bearing according to claim 4, wherein one end of said rotating shaft is spherically shaped.

6. The bearing according to claim 4, wherein one of a spiral pattern and a herringbone pattern is formed on said thrust bearing plate.

7. A bearing comprising:
   (a) a rotating shaft;
   (b) a sleeve which surrounds an outer wall of said rotating shaft and supports said rotating shaft in such a manner that said rotating shaft is rotatable; and
   (c) a thrust bearing plate which is fixed to said sleeve and supports one end of said rotating shaft,
   wherein a first herringbone pattern and a second herringbone pattern are formed on one of said rotating shaft and said sleeve, and an oil reserving groove is formed on said sleeve, wherein said oil reserving groove is located at a position which corresponds to an intermediate portion between said first herringbone pattern and said second herringbone pattern, and a through-hole and an air-bubble-holding-hollow are formed in a wall of said sleeve, wherein said through-hole extends from said thrust bearing plate up to said oil reserving groove and up to said air-bubble-holding-hollow.

8. The bearing according to claim 7, wherein one end of said rotating shaft is spherically shaped.

9. The bearing according to claim 7, wherein one of a spiral pattern and a herringbone pattern is formed on said thrust bearing plate.

10. A motor comprising:
    (a) a rotor having a rotating shaft fixed thereto;
    (b) a bearing including:
        (b-1) said rotating shaft;
        (b-2) a sleeve which surrounds an outer wall of said rotating shaft and supports said rotating shaft in such a manner that said rotating shaft is rotatable; and
        (b-3) a thrust bearing plate which is fixed to said sleeve and supports one end of said rotating shaft,
    wherein a first herringbone pattern and a second herringbone pattern are formed on one of said rotating shaft and said sleeve, wherein said first herringbone pattern is located at a first side and said second herringbone pattern is located at a second side, wherein the first side is a side where said thrust bearing plate is located, and the second side is a side opposite the first side,
    wherein a relation between width-A and width-B in said first herringbone pattern is expressed by $$0<(A-B)<0.2x(A+B)$$

where A denotes a dimension from a turning point of said first herringbone pattern to an end thereof in the first side, and B denotes a dimension from the turning point to an end thereof in the second side,
    and, a relation between width-C and width-D in said second herringbone pattern is expressed by $$0<(D-C)<0.2x(D+C)$$

where C denotes a dimension from a turning point of said second herringbone pattern to an end thereof in the first side, and D denotes a dimension from the turning point to an end thereof in the second side; and
    (c) a stator having said bearing.

11. The motor according to claim 10, wherein one end of said rotating shaft is spherically shaped.

12. The motor according to claim 10, wherein one of a spiral pattern and a herringbone pattern is formed on said thrust bearing plate.

13. The motor according to claim 10, wherein an oil reserving groove is further formed on said sleeve, wherein said oil reserving groove is located at a position which corresponds to an intermediate portion between said first herringbone pattern and said second herringbone pattern, and, a through-hole and an air-bubble-holding-hollow are further formed in a wall of said sleeve, wherein said through-hole extends from said thrust bearing plate up to said oil reserving groove and up to said air-bubble-holding-hollow.

14. The motor according to claim 13, wherein one end of said rotating shaft is spherically shaped.

15. The motor according to claim 13, wherein one of a spiral pattern and a herringbone pattern is formed on said thrust bearing plate.

16. The motor according to claim 13, wherein said air-bubble-holding-hollow is located above one of said rotating shaft and said thrust bearing plate in a field where gravitational attraction works vertically.

17. The motor according to claim 16, wherein one end of said rotating shaft is spherically shaped.

18. The motor according to claim 16, wherein one of a spiral pattern and a herringbone pattern is formed on said thrust bearing plate.

19. A motor comprising:
(a) a rotor having a rotating shaft fixed thereto;
(b) a bearing including:
(b-1) said rotating shaft;
(b-2) a sleeve which surrounds an outer wall of said rotating shaft and supports said rotating shaft in such a manner that said rotating shaft is rotatable; and
(b-3) a thrust bearing plate which is fixed to said sleeve and supports one end of said rotating shaft,
wherein a first herringbone pattern and a second herringbone pattern are formed on one of said rotating shaft and said sleeve, and an oil reserving groove is formed on said sleeve, wherein said oil reserving groove is located at a position which corresponds to an intermediate portion between said first herringbone pattern and said second herringbone pattern, and a through-hole and an air-bubble-holding-hollow are formed in a wall of said sleeve, wherein said through-hole extends from said thrust bearing plate up to said oil reserving groove and up to said air-bubble-holding-hollow; and
(c) a stator having said bearing.

20. The motor according to claim 19, wherein one end of said rotating shaft is spherically shaped.

21. The motor according to claim 19, wherein one of a spiral pattern and a herringbone pattern is formed on said thrust bearing plate.

22. The motor according to claim 19, wherein said air-bubble-holding-hollow is located above one of said rotating shaft and said thrust bearing plate in a field where gravitational attraction works vertically.

23. The motor according to claim 22, wherein one end of said rotating shaft is spherically shaped.

24. The motor according to claim 22, wherein one of a spiral pattern and a herringbone pattern is formed on said thrust bearing plate.

25. A disk drive having a motor comprising:
(a) a rotor, which has a rotating shaft fixed thereto, for rotating a disk;
(b) a bearing including:
(b-1) said rotating shaft;
(b-2) a sleeve which surrounds an outer wall of said rotating shaft and supports said rotating shaft in such a manner that said rotating shaft is rotatable; and
(b-3) a thrust bearing plate which is fixed to said sleeve and supports one end of said rotating shaft,
wherein a first herringbone pattern and a second herringbone pattern are formed on one of said rotating shaft and said sleeve, and an oil reserving groove is formed on said sleeve, wherein said oil reserving groove is located at a position which corresponds to an intermediate portion between said first herringbone pattern and said second herringbone pattern, and a through-hole and an air-bubble-holding-hollow are formed in a wall of said sleeve, wherein said through-hole extends from said thrust bearing plate up to said oil reserving groove and up to said air-bubble-holding-hollow, wherein said air-bubble-holding-hollow is located above one of said rotating shaft and said thrust bearing plate in a field where gravitational attraction works vertically; and
(c) a stator having said bearing.

26. A disk drive having a motor comprising:
(a) a rotor, which has a rotating shaft fixed thereto, for rotating a disk;
(b) a bearing including:
(b-1) said rotating shaft;
(b-2) a sleeve which surrounds an outer wall of said rotating shaft and supports said rotating shaft in such a manner that said rotating shaft is rotatable; and
(b-3) a thrust bearing plate which is fixed to said sleeve and supports one end of said rotating shaft,
wherein a first herringbone pattern and a second herringbone pattern are formed on one of said rotating shaft and said sleeve, wherein said first herringbone pattern is located at a first side and said second herringbone pattern is located at a second side, wherein the first side is a side where said thrust bearing plate is located, and the second side is a side opposite the first side,
wherein a relation between width-A and width-B in said first herringbone pattern is expressed by $$0<(A-B)<0.2\times(A+B)$$

where A denotes a dimension from a turning point of said first herringbone pattern to an end thereof in the first side, and B denotes a dimension from the turning point to an end thereof in the second side,
and, a relation between width-C and width-D in said second herringbone pattern is expressed by $$0<(D-C)<0.2\times(D+C)$$

where C denotes a dimension from a turning point of said second herringbone pattern to an end thereof in the first side, and D denotes a dimension from the turning point to an end thereof in the second side,
and an oil reserving groove is formed on said sleeve, wherein said oil reserving groove is located at a position which corresponds to an intermediate portion between said first herringbone pattern and said second herringbone pattern, and a through-hole and an air-bubble-holding-hollow are formed in a wall of said sleeve, wherein said through-hole extends from said thrust bearing plate up to said oil reserving groove and up to said air-bubble-holding-hollow,
wherein said air-bubble-holding-hollow is located above one of said rotating shaft and said thrust bearing plate in a field where gravitational attraction works vertically; and
(c) a stator having said bearing.

* * * * *